(12) United States Patent
Martin et al.

(10) Patent No.: US 7,044,326 B2
(45) Date of Patent: May 16, 2006

(54) NESTABLE ALUMINUM CONTAINER AND LID

(76) Inventors: John W. Martin, 8975-20 Lawrence Welk Dr., Escondido, CA (US) 92026; Mary A. Martin, 8975-20 Lawrence Welk Dr., Escondido, CA (US) 92026

( * ) Notice: Subject to any disclaimer, the term of this patent is extended or adjusted under 35 U.S.C. 154(b) by 0 days.

(21) Appl. No.: 10/952,766

(22) Filed: Sep. 30, 2004

(65) Prior Publication Data

US 2006/0065667 A1 Mar. 30, 2006

(51) Int. Cl.
*B65D 6/38* (2006.01)

(52) U.S. Cl. ............... 220/676; 219/91.2; 426/419
(58) Field of Classification Search ............ 220/676
See application file for complete search history.

(56) References Cited

U.S. PATENT DOCUMENTS

| 1,198,524 | A | * | 9/1916 | Cunliffe | 220/6 |
| 1,509,549 | A | * | 9/1924 | Freeland | 220/623 |
| 2,438,844 | A | * | 3/1948 | Dale | 220/676 |
| 2,739,734 | A | * | 3/1956 | Pugh | 220/676 |
| 2,746,824 | A | * | 5/1956 | Bond | 312/7.1 |
| 3,396,867 | A | * | 8/1968 | Garriga | 206/511 |
| 3,984,024 | A | * | 10/1976 | Fauvel | 220/675 |
| 4,597,503 | A | * | 7/1986 | Lates | 220/676 |
| 5,562,224 | A | * | 10/1996 | Pascal et al. | 220/4.33 |
| 5,789,007 | A | * | 8/1998 | Bianco | 426/263 |

* cited by examiner

*Primary Examiner*—Stephen Castellano
(74) *Attorney, Agent, or Firm*—Stephen C. Beuerle; Procopio Cory Hargreaves & Savitch LLP

(57) ABSTRACT

This invention concerns an aluminum alloy container and lid for transportation and handling of perishable products. It combines the ability to provide improved temperature control for the product, and in addition is reusable, nestable and recyclable. This container is comprised of two components, the box and the lid. The box is made from three separate pieces. The bottom and two sides are formed from the same piece of material. The two ends are formed separately and each are welded to the bottom and two sides. The lid is made from two separate pieces, the lid plate and the interface bracket. All parts are made of light aluminum alloy.

5 Claims, 2 Drawing Sheets

NESTABLE ALUMINUM CONTAINER AND LID

CROSS REFERENCE TO RELATED APPLICATIONS

"Not Applicable"

STATEMENT REGARDING FEDERALLY SPONSORED RESEARCH O DEVELOPMENT

"Not Applicable

THE NAMES OF THE PARTIES TO A JOINT RESEARCH AGREEMENT

"Not Applicable"

INCORPORATION BY REFERENCE OF MATERIAL SUBMITTED ON A COMPACT DISC

"Not Applicable"

BACKGROUND OF THE INVENTION

Field of the Invention

A new concept in the design and construction of shipping containers for fruits and vegetables to maximize refrigerated air flow while in transit.

BRIEF SUMMARY OF THE INVENTION

This invention is a nestable, reusable and recyclable container for the shipping of fruits and vegetables. Presently used truck trailers do not satisfactorily maintain vegetable temperatures in transit using present day designed containers.

DETAILED DESCRIPTION OF THE INVENTION

Figure 1:
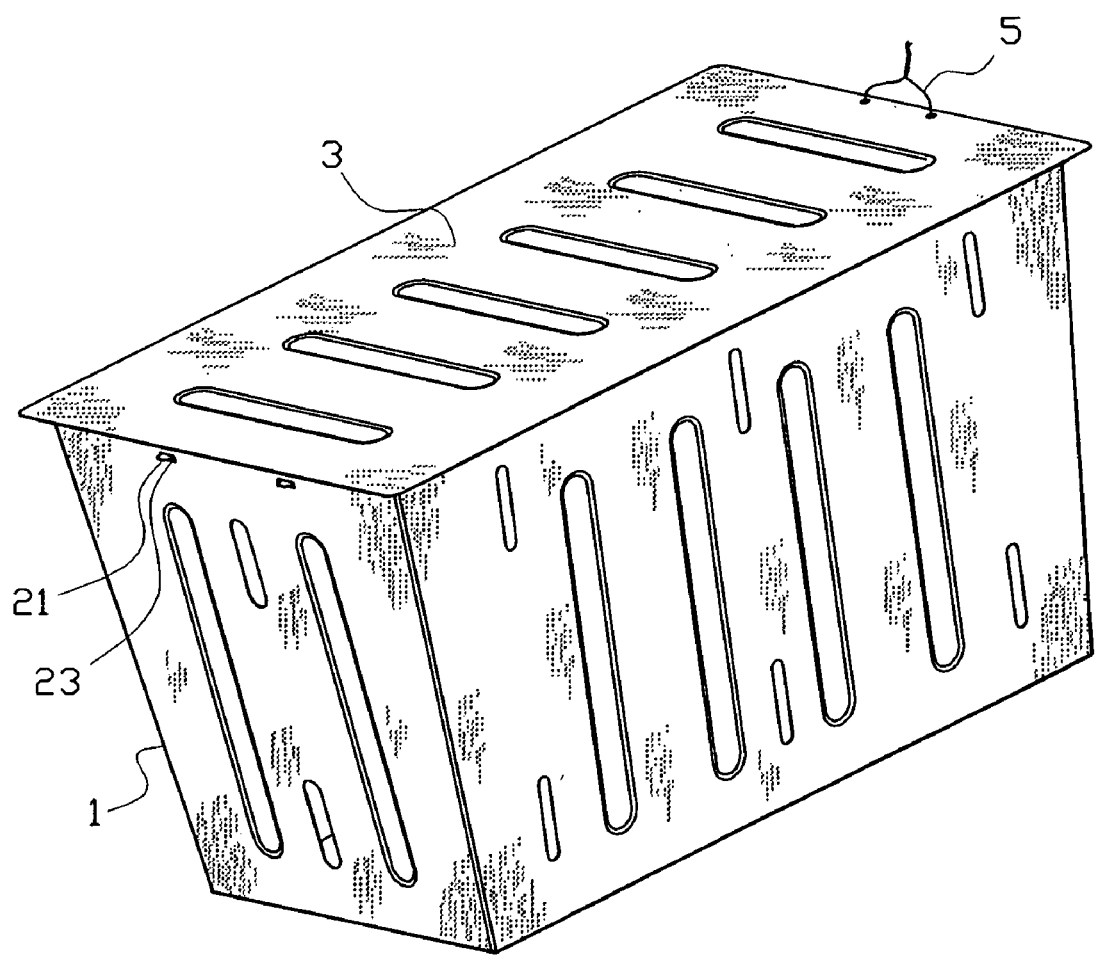
FIG. 1. Is an isometric view showing the assembled container with the lid in place and the optional safety/security wire inserted.
Figure 2:
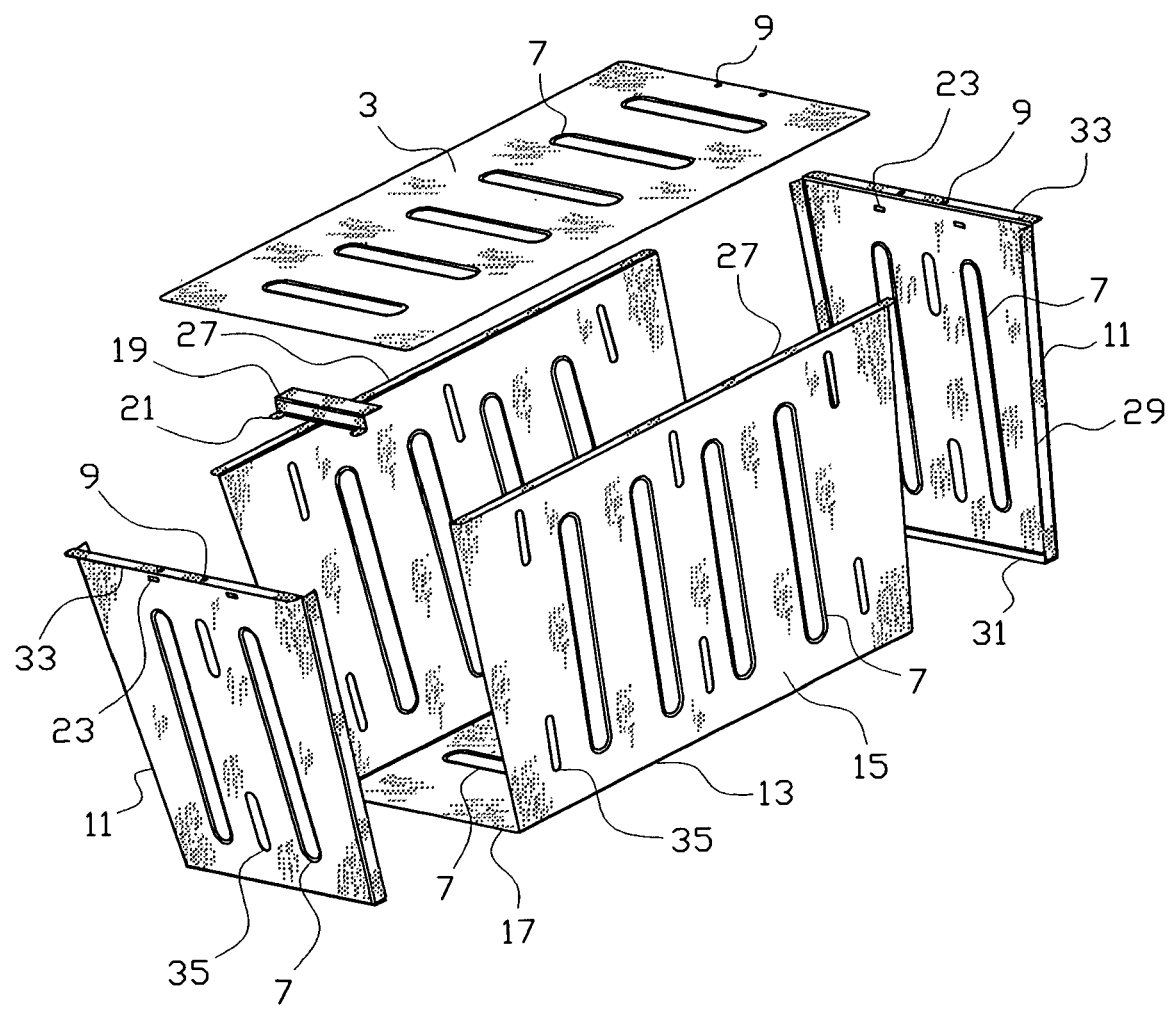
FIG. 2 Is an exploded isometric view showing the components before welding and assembly.

This invention relates to a new and improved container for shipping of fruits and vegetables. It combines the ability to provide improved temperature control for the product, and in addition is reusable, nestable and recyclable.

The produce marketing industry urgently needs a new concept in shipping containers to help solve contemporary marketing problems that erode quality and value while inflating costs. These challenges demand shipping containers that outperform by far the traditional ones in terms of product safety, conduction of refrigerated air throughout the shipping load and reducing both container and shipping costs. We have developed and tested this long-awaited, new generation shipping container.

Made of aluminum alloy in a dramatically improved shipping container design, the new container extends the shelf life of fresh fruits and vegetables by increasing refrigerated air flow while produce is on its way to market, in refrigerated truck trailers or in marine containers. This container allows for horizontal as well as vertical airflow. Aluminum alloy metal is a conductor of cold, which allows the cold to travel into the product being shipped. The new container has been designed to minimize the risk of food borne illnesses. We realize that fresh fruits and vegetables are so important to public health that potentials for microbiological contamination in growing, packing and distribution have to be eliminated. The packaging of fresh fruits and vegetables is one of the most important steps in the long and complicated journey from grower to consumer. This invention has been designed to lessen the chance of pathogens and mold injury.

This invention pertains to a container and lid. The container is made in three pieces. The bottom and sidewalls are formed from one piece of light aluminum alloy. The two sides and the bottom have stiffening ribs. The ends are fashioned with stiffening ribs to add to the strength of the light aluminum alloy. The box is then formed by folding the sides, inserting the two ends and spot welding them together. All ventricle pieces of the box are formed so as to allow for nesting.

The lid is formed with stiffening ribs to match the bottom of the next box. This enables stacking when filled and in transit. The stiffening ribs also enable the box to stay in place, when being stacked one on the other.

For the last 54 years produce containers have been made of corrugated fiberboard. Fiberboard is an insulator for cold. Corrugated fiberboard is the dominant produce container material today. Thirty percent of these are wax impregnated, and are causing huge waste management problems in our cities. All of these are made for a one time use. Corrugated fiberboard loses strength over time when it is supporting weight. For example after supporting weight for 10 days a fiberboard box will have only 65 percent of its original laboratory determined strength. Fiberboard also absorbs moisture and weakens when it is exposed to high relative humidity, which is generated by the produce inside the box. Fiberboard in moisture equilibrium with air at 90 percent RH will have only 40 percent of its original stacking strength. Absorbed moisture also causes fiberboard to expand slightly, increasing box dimensions and sometimes causing warping. Box venting also reduces box strength. Produce containers must have adequate venting to allow the air to flow through the product.

Wax corrugated fiberboard boxes are used when ice or higher humidity is necessary. This makes the container stronger but heavier. The US Government has given the industry warning that they must find a substitute for the wax containers because they are not reusable or recyclable.

Plastic returnable containers are now being used to some degree. The problem with plastic is (1) Original cost for tooling is high, (2) they are heavier or equal to corrugated in weight and (3) class A plastics are flammable, increasing insurance costs for warehousing. (4) while they are returnable they consume more space in the returnable load, causing high return costs.

Our invention gives the answer to the problems that are being faced by the corrugated fiberboard, the wax fiberboard and the plastic containers by being lighter weight, reusable and recyclable after final uses. In addition and most importantly it is able to deliver the product in a better condition by being a good conductor of cold throughout the load. Relative humidity should be 90% to 98% on most vegetables. The present fiberboard carton cannot hold this percentage without weakening the carton. Icing on our invention can be internal or external. The light weight metal containers create a narrow air space between boxes on all four sides of the container. This will improve the air flow throughout the load. Less power would be necessary to hold the desired cold temperature and by using less ice and a lighter container there would be fuel savings on delivery.

The ends of the metal container are constructed in a manner so that the box can be stacked when filled. One on the other and when empty can be nested together for storing or returning. The fiberboard box is not reusable and the plastic container consumes more more space on the load when being returned Recycling Comparisons The Attorney General of New York City conducted a survey of recycling programs dated May 1, 2000. He strongly believes in the future of recycling as a crucial element of responsible solid waste management. The need to reduce demand for landfill space is more urgent than ever, since the vast majority of New York's landfills have been closed and the State's largest landfill, Fresh Kills in Staten Island, will close at the end of 2001. The intrinsic environmental benefits of recycling conservation of natural resources and reduction of pollution and energy consumption—remain compelling reasons to step up recycling efforts.

The operating landfills in New York has dwindled from 294 to just 28. They were closed due to concern about ground water contamination. The municipalities now have to bear the added cost of transporting solid waste to more distant land fills. Federal regulations classify pulp and paper mills as generators of significant quantities of Hazardous Air Pollutants. Chlorinated and non chlorinated. Some of these pollutants are considered to be carcinogenic, and all can cause toxic health effects following exposure.

Similarly, the production of plastic products from crude petroleum produces substantial air and water pollution that can be mitigated by the use of recycled plastic. The Environmental Protection Agency estimated in 1994 that plastics production facilities in the U.S. generated more than 114 million pounds of production related wastes, and hundreds of thousands of pounds of other pollutant releases including more than 12 million pounds of ozone depleting chemicals.

Plastics are more difficult to recycle than metal, paper, or glass. One problem is that any of seven categories of plastics can be used for containers alone. For effective recycling, the different types cannot be mixed. Plastics are flammable.

Aluminum is the most abundant metallic element, estimated to form about 8% of the solid portion os the earths crust. The use of recycled metals reduce the need for electricity and the need for ore mining operations that can damage the landscape and leach pollutants in the soil and water and save electricity. The commercially important ore of aluminum is bauxite, It contains about 50 to 60 percent alumina. It takes about 2 pounds of bauxite to make a pound of alumina, and 2 pounds of alumina to make a pound of aluminum. It takes about 10 kilowatt hours of electricity to produce a pound of aluminum; Aluminum is easy to bond, roll, form, weld and stamp in sheet form. United States aluminum industry is the world's largest, annually producing about $39.1 billion in revenues.

The invention claimed is:

1. An aluminum alloy container for cooling produce, comprising:
   a container made of a light aluminum alloy, the container including a first container piece forming a bottom and opposite sides with embossed stiffening ribs to add strength to the light aluminum alloy and upper flanges, a second container piece welded to the first container piece to form an end with embossed stiffening ribs, end holes, and upper flanges, and a third piece welded to the first container piece to form an opposite end with embossed stiffening ribs, end holes, and upper flanges, the sides and ends including vent holes configured to maximize refrigerated air flow there through and angled relative to vertical to allow for horizontal as well as vertical airflow when multiple adjacent stacks of the aluminum alloy container are provided in a produce shipping load; and
   a lid made of a light aluminum alloy supportable by the upper flanges, the lid including a lid plate with embossed stiffening ribs to add strength to the light aluminum alloy and configured to mate with the embossed stiffening ribs of the bottom for stacking aluminum alloy containers, and an interface bracket welded to the lid plate and including projections configured to lock in place with the end boles of one of the ends for securing the lid to one of the ends,
   wherein the aluminum alloy container is reusable, nestable, and recyclable.

2. A method of manufacturing the aluminum alloy container for produce of claim 1, the method comprising:
   assembling the container by folding up the sides of the first piece of a light aluminum alloy to form opposite end openings;
   inserting the second piece of a light aluminum alloy forming an end into the end opening of the folded first piece;
   inserting the third piece of a light aluminum alloy forming an end into the opposite end opening of the folded first piece;
   spot welding the end formed by the second piece and the opposite end formed by the third piece to the first piece, wherein the sides and ends being angled relative to vertical to allow for horizontal as well as vertical airflow when multiple adjacent stacks of the aluminum alloy container are provided in a produce shipping load;
   welding the interface bracket to the lid plate,
   and securing the lid to the container by supporting the lid on the upper flanges, and locking the projections of the interface bracket in place with the end holes of one of the ends of the container,
   wherein the aluminum alloy container is reusable, nestable, recyclable.

3. A method of using the aluminum alloy container of claim 1 for cooling produce in a produce shipping load, the method comprising:
   providing multiple aluminum alloy containers of claim 1;
   providing produce in the multiple aluminum alloy containers;
   attaching the lid to each aluminum alloy container;
   stacking the aluminum alloy containers on top of each other in the shipping load so that the embossed stiffening ribs of the lid of a lower aluminum alloy container mates with the embossed stiffening ribs of the bottom of an aluminum alloy container stacked thereon;
   circulating horizontal as well as vertical cooling airflow past the sides and ends of the aluminum alloy containers, in the space between the aluminum alloy containers, and circulating cooling airflow through the vent holes of the aluminum alloy containers for cooling produce.

4. A method of manufacturing an aluminum alloy container for produce, comprising:

providing a first container piece of a light aluminum alloy including a bottom and opposite sides with embossed stiffening ribs to add strength to the light aluminum alloy, upper flanges, and vent holes configured to maximize refrigerated air flow there through;

providing a second container piece of a light aluminum alloy forming an end with embossed stiffening ribs to add strength to the light aluminum alloy, end holes, upper flanges, and vent holes configured to maximize refrigerated air flow there through;

providing a third container piece of a light aluminum alloy forming an opposite end with embossed stiffening ribs to add strength to the light aluminum alloy, end holes, upper flanges, and vent holes configured to maximize refrigerated air flow there through;

assembling the container by folding up the sides of the first piece of a light aluminum alloy to form opposite end openings;

inserting the second piece of a light aluminum alloy forming into an end opening of the folded first piece;

inserting the third piece of a light aluminum alloy forming an opposite end into an opposite end opening of the folded first piece;

spot welding the end formed by the second piece and the opposite end formed by the third piece to the first piece, wherein the sides and ends being angled relative to vertical to allow for horizontal as well as vertical airflow when multiple adjacent stacks of the aluminum alloy container are provided in a produce shipping load;

providing a lid made of a light aluminum alloy supportable by the upper flanges, the lid including a lid plate with embossed stiffening ribs to add strength to the light aluminum alloy and configured to mate with the embossed stiffening ribs of the bottom for stacking aluminum alloy containers;

providing an interface bracket including projections configured to lock in place with the end boles of one of the ends for securing the lid to one of the ends;

welding the interface bracket to the lid plate, and securing the lid to the container by supporting the lid on the upper flanges, and locking the projections of the interface bracket in place with the end holes of one of the end of the container, wherein the aluminum alloy container is reusable, nestable, recyclable.

5. A method of using an aluminum alloy container for cooling produce in a produce shipping load, comprising:

providing multiple reusable, nestable, and recyclable aluminum alloy containers made of a light aluminum alloy, each aluminum alloy container including a first container piece forming a bottom and opposite sides with embossed stiffening ribs to add strength to the light aluminum alloy and upper flanges, a second container piece welded to the first container piece to form an end with embossed stiffening ribs, end holes, and upper flanges, and a third piece welded to the first container piece to form an opposite end with embossed stiffening ribs, end holes, and upper flanges, the sides and ends including vent holes configured to maximize refrigerated air flow there through and angled relative to vertical to allow for horizontal as well as vertical airflow when multiple adjacent stacks of the aluminum alloy container are provided in a produce shipping load; and providing produce in the multiple aluminum alloy containers;

attaching a lid to each aluminum alloy container, the lid made of a light aluminum alloy supported by the upper flanges, the lid including a lid plate with embossed stiffening ribs to add strength to the light aluminum alloy and configured to mate with the embossed stiffening ribs of the bottom for stacking aluminum alloy containers, and an interface bracket welded to the lid plate and including projections configured to lock in place with the end holes of one of the ends for securing the lid to one of the ends;

stacking the aluminum alloy containers on top of each other in the shipping load so that the embossed stiffening ribs of the lid of a lower aluminum alloy container mates with the embossed stiffening ribs of the bottom of an aluminum alloy container stacked thereon;

circulating horizontal as well as vertical cooling airflow past the sides and ends of the aluminum alloy containers, in the space between the aluminum alloy containers, and circulating cooling airflow through the vent holes of the aluminum alloy containers for cooling produce.

\* \* \* \* \*